United States Patent [19]

Boliek et al.

[11] Patent Number: 5,408,328
[45] Date of Patent: Apr. 18, 1995

[54] COMPRESSED IMAGE VIRTUAL EDITING SYSTEM

[75] Inventors: Martin P. Boliek, Palo Alto; Robert F. Miller, Modesto; Steven M. Blonstein, Palo Alto, all of Calif.

[73] Assignee: Ricoh Corporation, California Research Center, Menlo Park, Calif.

[21] Appl. No.: 124,250

[22] Filed: Sep. 20, 1993

Related U.S. Application Data

[63] Continuation-in-part of Ser. No. 857,037, Mar. 23, 1992.

[51] Int. Cl.⁶ .................................... H04N 1/411
[52] U.S. Cl. ........................... 358/261.4; 358/433; 358/452; 358/453
[58] Field of Search ............... 358/261.1, 261.4, 261.2, 358/418, 419, 420, 426

[56] References Cited

U.S. PATENT DOCUMENTS

| | | | |
|---|---|---|---|
| 4,797,739 | 1/1989 | Tanaka | 358/133 |
| 4,800,425 | 1/1989 | Schwerzel | 358/136 |
| 4,851,906 | 7/1989 | Koga | 358/133 |
| 4,868,570 | 9/1989 | Davis | 341/106 |

*Primary Examiner*—Edward L. Coles, Sr.
*Assistant Examiner*—John Ning

*Attorney, Agent, or Firm*—Townsend and Townsend Khourie and Crew; Philip H. Albert

[57] ABSTRACT

In an image compression system using a typical image compression scheme, a pointer array is provided to point to each of the many MCUs in a compressed image file. From all the blocks of an image, a subset of the blocks is selected as a virtual image. The virtual image is edited, and each edited block is compressed into an edited block. The edited block is compressed into an edited MCU and placed in an edited block region, and the pointer to the original MCU is changed to point to the new MCU. In this way, the pointer array can be modified to perform an Undo operation. An edge table is provided to hold values where each value, when combined with the differential value for a block on the edge of the virtual image, provides an absolute value for the block without reference to blocks beyond the edge of the virtual image. The entries in the edge table are determined from the compressed MCUs without the blocks being fully decompressed. More than one edge table can be provided. In an image editor, a virtual image is decompressed from a compressed image, the virtual image is processed, and recompressed. The recompressed, edited blocks are then placed in an edited block memory. In an alternate embodiment, values to be combined with a differential value are held in an offset table for all the selectable blocks.

18 Claims, 7 Drawing Sheets

COMPRESSED IMAGE VIRTUAL EDITING SYSTEM

This application is a continuation-in-part of application Ser. No. 07/857,037, filed Mar. 23, 1992, incorporated herein by reference for all purpose.

BACKGROUND OF THE INVENTION

The present invention relates to the field of editing compressed images. More specifically, in one embodiment the invention provides means for editing portions of compressed images without decompressing the entire image.

Modern color imagery for cameras and scanners requires huge amounts of memory to store image files containing a data representation of the input or scanned image. A typical image such as that used with a color copier with 8.5"×11" (216 mm×297 mm) paper, a resolution of 400 dots per inch (15.75 per mm), and 3 bytes (24 bits) to represent the color for each dot, would occupy 44.88 megabytes of memory. In addition to the size of the memory, the memory must have high bandwidth for real time applications, such as a color copier where 15 pages per minute is a typical demand. This implies a bandwidth, or data rate, of almost 90 megabits/second. Both these requirements drive up the cost of imaging systems. Compression techniques have been used to solve both the bandwidth and the storage problems for quite a while. With compression, an image file can be stored in less memory, and the image can be moved across any bandwidth-limited channel faster since fewer bits are used to represent the image. Compression involves passing the raw image data into a compressor, which combines and analyzes the patterns in the raw data to produce a compressed image file where the original image is not readily discernable without a corresponding decompression.

If an image is to be edited, scaled, rotated, or otherwise processed, random access to any or all of the pixels is required. Once the processing is complete, the edits must be saved to the image file to update the pixels in that image. If the image file being processed is compressed, the conventional means for obtaining random pixel access is to decompress the entire image into a frame store, perform the processing, and then recompress the image into a new image file. The problem with this is that no memory is saved by decompressing, since memory is needed for the frame store. The bandwidth is also lowered, since compression and decompression of entire images takes time. This additional processing time and memory is often wasted, since even the most expensive display in an imaging system could not display the entire image at full resolution.

Compression methods for compressing image data are known. One such compression standard is JPEG (Joint Photographic Experts Group). Other standards include JBIG, Fax G3 or G4, and GIF. In JPEG, to give one example, an image is represented by a two-dimensional array of picture elements, or pixels. If the image is grayscale, each pixel is represented by an intensity value, and if the image is color, the image is divided into several component images (such as red, green and blue components for an image separated according to the RGB color separation standard), with each pixel of each component image represented by a component color value.

Before image data (referred to herein as an image file, which contains the data from an image) is compressed into a compressed image file, the image is divided into components (unless the image is monochrome, in which case there is only one component) and then each component is divided into blocks each covering an image area of a square of eight by eight, or 64, pixels. Within each block, the 64 pixels are transformed, using a discrete cosine transform, into 64 frequency-like basis function amplitudes, where one is a DC value and the other 63 are AC values. These values are then encoded into compressed image data.

To achieve high compression, a difference between the DC value of a block and the DC value of a preceding block is used in place of the absolute DC value of the block. Given that in most images, fewer bits are needed to represent the differential values than the absolute values, higher overall compression ratios of the image data can be obtained. For this reason, many image compression schemes other than JPEG use similar techniques for compression and the use of differential values.

Subsampling of color is often used to increase the compressibility of an image. Where an image is separated into the three components of the YUV (Y, $C_r$, $C_b$) color space, the Y component represents luminance (Y), the U, or $C_r$, component represents the red minus green chrominance, and the V, or $C_b$, component represents the blue minus green chrominance. Visually, the luminance component is the most important components and the resolution of the other two components can often be reduced without introducing undesirable artifacts into an image. This reduction of color resolution relative to luminance resolution is known as subsampling. Reducing the resolution of each color component (U and V) by half is referred to as 2:1:1 subsampling, since for each two luminance (Y) pixel color values, only one pair of (U,V) pixel color values are provided. Without subsampling (1:1:1), a one-pixel area is described by a total of three pixels (1 L, 1 U, 1 V), whereas with 2:1:1 subsampling, a two-pixel area is described by a total of four pixels (2 L, 1 U, 1 V), resulting in a reduction of the image data file size by a third. With 4:1:1 subsampling, a four-pixel area is covered by six pixels rather than twelve, resulting in a reduction of image data file size by a half. When subsampling is used, the blocks of different color components span different sized areas, so to keep the component blocks together, all the blocks for a small area are kept together when coding and decoding. For example, with 2:1:1 subsampling, four blocks, a U block, a V block, and two Y blocks are needed to cover an area of 8 pixels by 16 pixels, so those four blocks are kept together. With 4:1:1 subsampling, a region of 16 pixels by 16 pixels is covered by six blocks (4 Y, 1 U, 1 V), which are kept together. This smallest unit of compressible and decompressable data is known as a "minimum coded unit" or "MCU". According to the JPEG standard, data can be extracted from a compressed image file one MCU at a time.

The process of compression involves transforming each of the 64 pixel color values associated with a block into a differential DC value and 63 AC values, grouping blocks together into MCUs for multi-block MCUs, and then reducing the number of bits needed to describe each MCU through entropy encoding. The compressed MCUs which make up a compressed image are then tagged with identifying information, such as the MCU's location within the image when uncompressed, length data to indicate how many bits are contained in the MCU and the like, and the MCUs are stored sequentially as a compressed image file. Length data is needed since the MCUs are variable length, the length being a function of the data being compressed and the type of compression used. The process of entropy encoding is generally referred to as coding, while compressing refers to the process of blocking, cosine transforming and coding image data.

Significantly, differential DC values for blocks of an image can be extracted from a compressed image after the step of entropy decoding the image data, which is less effort than completely decompressing the image which, for one, requires the additional step of inverse cosine transforming the data. Because a block need not be inverse transformed to obtain its DC value, the effort required to obtain the DC value is much less than that of obtaining the decompressed block, since cosine transforms and inverse transforms are very computationally intense operations.

To decompress an image, each MCU from an image file is decompressed into one or more image blocks by the reverse operations of those operations used to compress the data. Entropy decoding is applied to a compressed MCU, and the result is a differential DC value and 63 AC values for each block. Next, the differential DC values are converted to absolute DC values by adding the absolute DC value of the block to the left of the block of interest. Of course, for this DC value regeneration process to work, all the blocks to the left of the block of interest must be processed. Next, the blocks are passed through an inverse cosine transform, to result in the uncompressed pixel color value data.

While differential encoding of slowly changing values from block to block, such as the DC value, increases the compression, it increases the difficulty of decompressing less than all of an image, since decompression of some blocks in the partial image will require reference to blocks which are not in the partial image.

Further difficulties arise in partial decompression when the partial image is edited and recompressed, since the degree of compression depends on the orderliness of the image data, and therefore MCUs will change size as the image portion which they represent changes. Consequently, simply replacing the MCUs from the partial image with the MCUs from the edited partial image is impractical, unless the entire image is decompressed, edited and recompressed.

From the above it is seen that an improved method for manipulating and editing compressed images is needed.

SUMMARY OF THE INVENTION

The present invention allows for pixel level manipulation of images that remain for the most part in a compressed form. In an image compression system using a typical image compression scheme, a pointer array is provided with pointers pointing to the MCUs in a compressed image file, and in some embodiments, a DC value table is provided to allow an absolute DC value for a block to be calculated without needing a reference to data in any other block. From all the blocks of an image, a subset of the blocks is selected as a "virtual" image. In some embodiments, the virtual image is moved around to cover more image area then one virtual image, and in some cases, it serially covers the entire image area.

The virtual image is decompressed/decoded and edited, each edited MCU (i.e., its one or more blocks) is compressed into an edited MCU, and the pointer to the original MCU is changed to point to the edited MCU, which is stored in the edited image data region. In this way, the pointer array can be modified to perform an "Undo" operation, which is useful in an interactive image editing application. Of course, instead of an interactive image editing application, the entire input image file could be edited by a serial process which creates a separate output image file.

The present invention provides, as one benefit, one means for handling differentially encoded values within blocks where not all blocks are decoded from compressed MCUs. An edge table is provided to hold values, where each value, when combined with the differential value for a block on the edge of the virtual image, provides an absolute value for the block without reference to blocks beyond the edge of the virtual image. The entries in the edge table are determined from the compressed blocks without the blocks being fully decompressed, since the inverse cosine transform is not necessary for the creation of the edge tables. More than one edge table can be provided to improve the speed of computing absolute values from differential values where speed is more valuable than the additional storage requirements. Computation of absolute values is faster, on the average, with more edge tables since computational speed is proportional to the distance from a block to the nearest edge having an edge table.

Where speed is especially at a premium relative to storage for differentially encoded values such as the DC value for each block, the DC values for all the blocks comprising an image are extracted and stored to a DC value array.

If both speed and storage space are at a premium, in yet another embodiment, differential DC values are differential relative to a fixed DC value. The benefit of this embodiment is that, while not being JPEG-compatible, each MCU is separately decompressable and no edge tables or DC value arrays are needed. The conversion of an image between an image file used in this embodiment and a JPEG-compatible image file is a lossless, reversible operation which is computationally simple.

The present invention also provides a means for reindexing a compressed, edited image, to resort all the MCUs and replace MCUs from the original image data region with MCUs from the edited image data region. The described embodiment of the present invention works with image data compressed according to the JPEG standard, but the invention is applicable for any image compression scheme where blocks are compressed into variable-sized MCUs or where the data is encoded with differential values whereby reference must be made to other MCUs in order to fully decode an MCU.

In an image editor according to the present invention, a compressed image is loaded in a main memory area, and selected MCUs to be edited are decompressed from the main memory area, passed to the editor, edited, and recompressed by a compressor. The recompressed, edited MCUs are then placed in an edited block memory. A pointer array is provided to point to MCUs either in the main memory area or the edited MCU memory, such that the pointers in the array point to each MCU of the image after editing. Of course, the selected MCUs might include every MCU of the image, such as would be the case in a process where all the MCUs are edited and replaced in a serial fashion.

The editing functions include, but are not limited to, rotation, translation, scaling, filtering, masking and blending. Masking is the process of cropping an image according to a masking function which evaluates to a masking value at each pixel. Blending is the process of combining two images, pixel-by-pixel, according to a blending function which evaluates to a weighting value at each pixel for each image being blended.

A further understanding of the nature and advantages of the inventions herein may be realized by reference to the remaining portions of the specification and the attached drawings.

DESCRIPTION OF THE PREFERRED EMBODIMENTS

Figure 1:
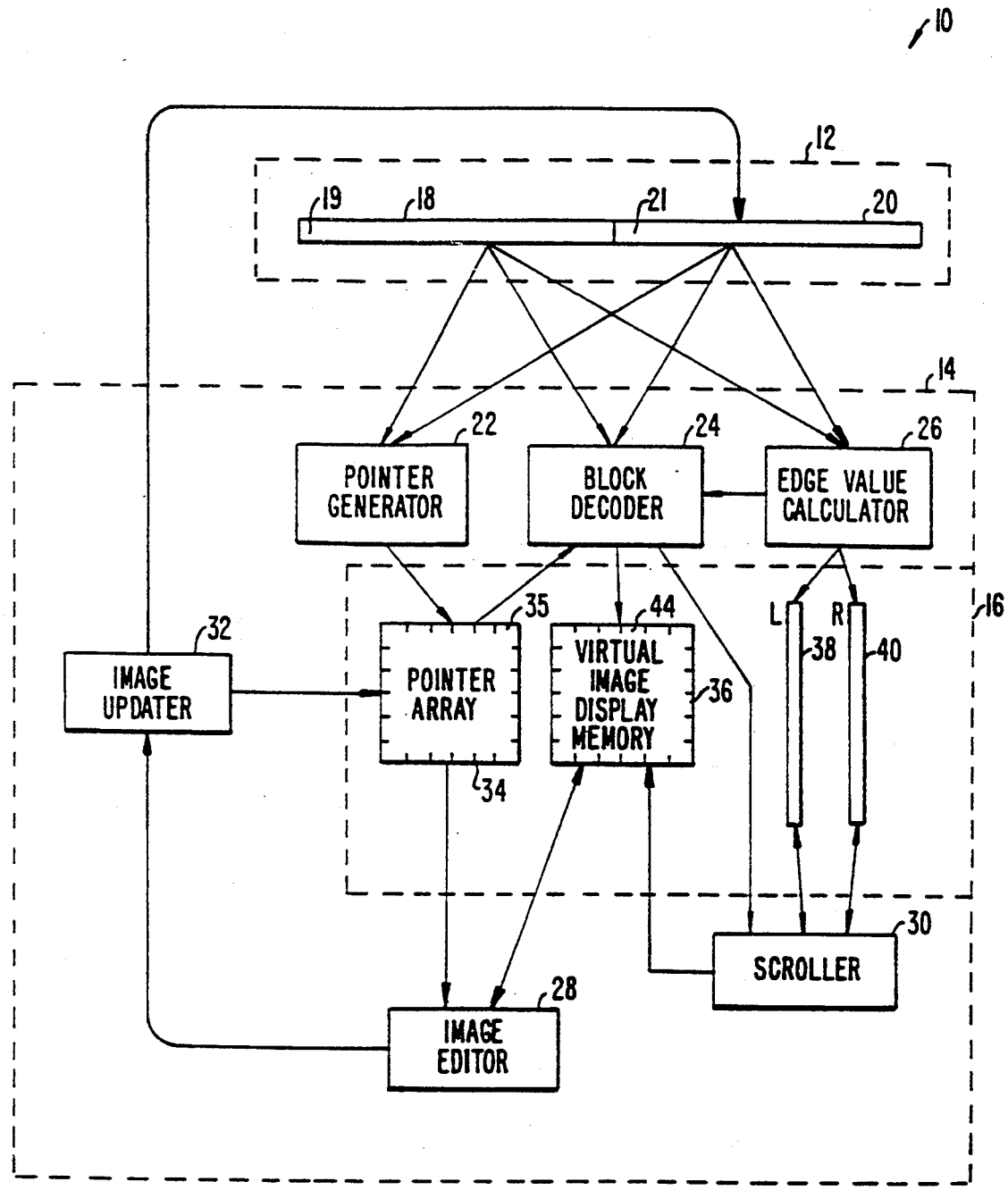
FIG. 1 is a block diagram of an editing system according to the present invention.

FIG. 1 functionally illustrates an embodiment of an editing system 10 according to the present invention. Editing system 10 includes a compressed image memory 12, an image processor 14, and an image memory 16. Compressed image memory 12 includes an original image data region 18 containing a compressed image 19 and an edited image data region 20 for holding edited MCUs 21. Image processor 14 includes a pointer generator 22, a block/MCU decoder 24, an edge value calculator 26, an image editor 28, a scroller 30 and an image updater 32. These elements of image processor 14 could be implemented as discrete hardware, software subroutines run by the processor, or a combination of the two. The editing system 10 is useful as an interactive application, such as where a user issues editing commands using a mouse and/or a keyboard while viewing a portion of the image, but editing system 10 is also useful as a component in an image processing system wherein images and commands are supplied to editing system 10 without user interaction.

Image memory 16 includes a pointer array 34, a display memory 36, a left edge table 38 and a right edge table 40. Compressed image memory 12 is digital memory such as random access memory (RAM), magnetic disk, or other storage media.

Before any editing is done on compressed image 12, edited image data region 20 is empty and contains no edited MCUs 21. The amount of memory allocated to edited image data region 20 can be varied according to the needs of the user or application based on the amount of editing to be done and the need for multiple undo operations. The initialization of image memory 16 will now be described.

Image memory 16 is initialized at the start of an editing session, or whenever a new compressed image is loaded into compressed image memory 12. An image comprises a two dimensional array of blocks. For color images, the image is first subdivided into several color component layers and each color component is treated as a single image. In the following discussion, only a single color component image will be described, but the principles discussed can be extended to multiple color components and subsampled color components in a straightforward manner. A block typically contains an eight pixel by eight pixel square, providing 64 intensity values when uncompressed, and an image is formed by an N by M array of such blocks. Since each block is $8 \times 8$ pixels, for an $8.5'' \times 11''$ image at 400 pixels per inch, N is 425 and M is 550, for a total of 233,750 blocks per image assuming a single component per pixel. Continuing with this example, compressed image 19 would contain 233,750 blocks containing compressed data. The MCU, or minimum code unit, for this example would be one block.

If the image in compressed image memory 12 has been edited and has not been reindexed, edited image data region 20 will contain MCUs of compressed data, with each MCU in region 20 replacing an MCU in original image data region 18. If a block has been edited more than once, region 20 will contain more than one MCU which might replace an MCU in region 18, however only one edited MCU will actually replace the block in region 18. Pointer generator 22 scans region 18 and places a pointer to the start of each MCU into pointer array 34. Because of the one-to-one correspondence between blocks, MCUs and pointers, array 34 contains $N \times M$, or 233,750 entries.

Figure 2:
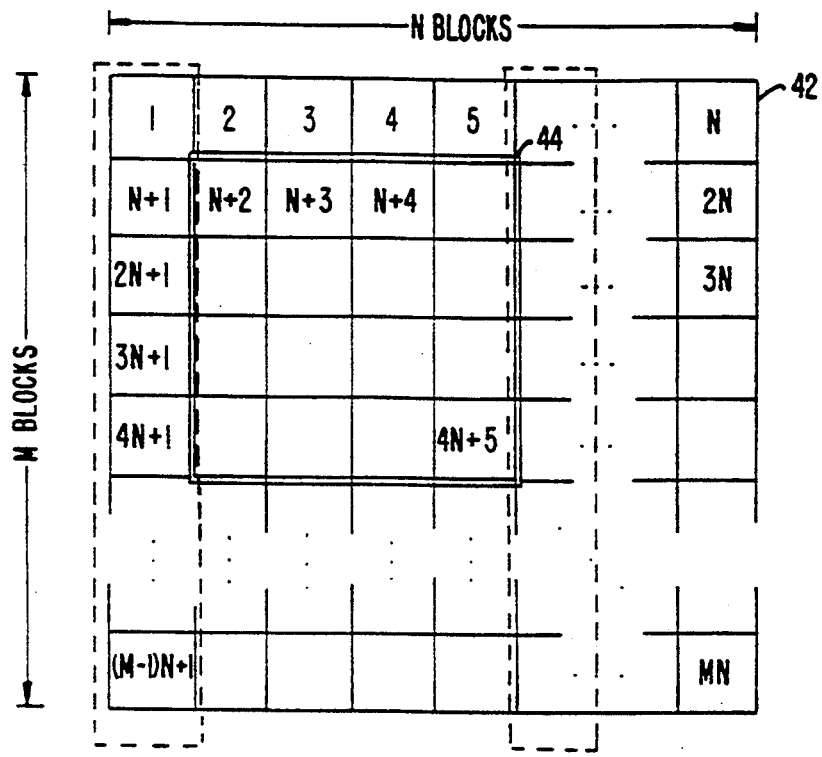
FIG. 2 shows a memory map of a display memory and a compressed image in a two-dimensional array.
Figure 3:
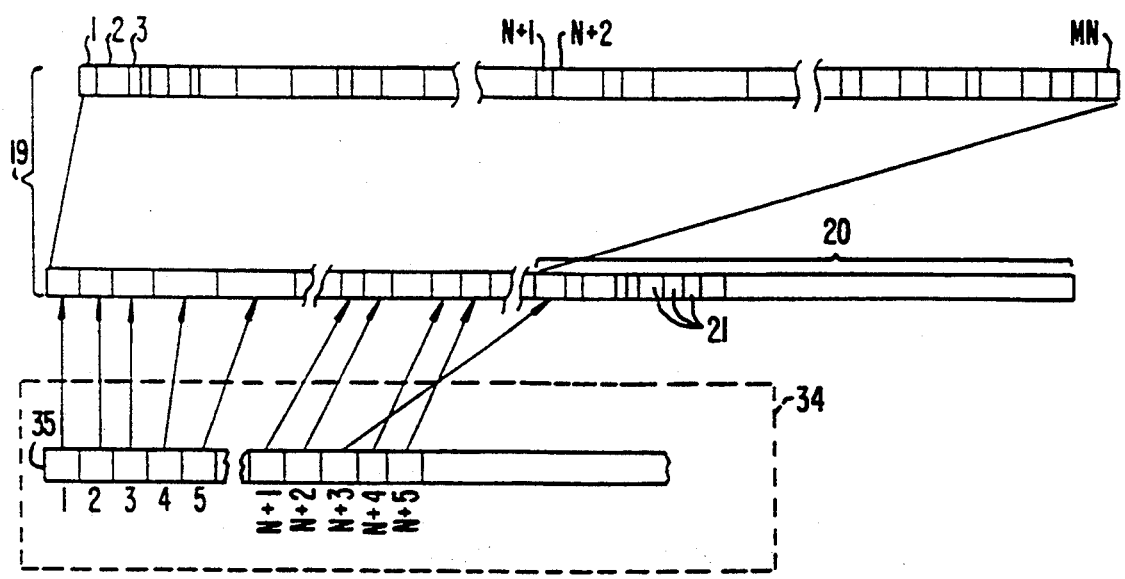
FIG. 3 shows an image file containing MCUs and a pointer array, each in a linear array, with numbering corresponding to FIG. 2 when the image uses one-block MCUs.

FIGS. 2 and 3 better illustrate how the pointers in pointer array 34 are arranged. A first pointer 35 points to the first MCU of compressed image 19. Other pointers are likewise associated their corresponding MCUs. Pointer array 34 can be logically arranged in a two dimensional array as shown in FIG. 1 to correspond with the arrangement of MCUs in the image, or it can be arranged in a one dimensional array as shown in FIG. 3. Each pointer points to an MCU in region 18 or, as in the case of pointer n+3, to an MCU in region 20. The block numbering in FIGS. 2 and 3 assumes one block per MCU, but the example is easily extended to multi-block MCUs.

Referring again to FIG. 1, once each MCU in region 18 is scanned, pointer generator 22 scans edited image data region 20. Each MCU in region 20 contains image data replacing the data in another MCU. The MCU in region 20 either replaces an MCU in region 18, if it is the first time an original MCU is edited, or replaces another MCU in region 20 if the MCU has already been edited. Each MCU in region 20 contains a pointer to the MCU which is replaced. Therefore, pointer generator 22 simply scans each MCU in region 20, and updates the pointers in pointer array 34. Pointer generator 22 scans region 20 from older edits to newest edits, so that if multiple edits exist in region 20 for a single MCU, only the latest MCU is pointed to by a pointer in pointer array 34.

Once pointer array 34 is initialized, decoder 24 uses the pointers in array 34 to find selected MCUs in region 18, however in other embodiments, decoder 24 locates MCUs in region 18 without reference to pointer array 34. However, using pointer array 34 is preferred since it avoids duplication of effort. Decoder 24 could decode the entire image stored in compressed image memory 12, however several benefits of the present invention would be lost.

Typically, image editing will only concern a small portion of the full image at a time. This portion, a "virtual image" is decoded and then manipulated by editor 28 as a complete image. FIG. 2 illustrates how a virtual image 44 relates to a full image 42. In FIG. 2, full image 42 measures N by M blocks, while virtual image 44 measures four by four blocks.

Returning to FIG. 1, but continuing the example above, virtual image 44 is the selected virtual image for editing, and decoder 24 decodes only the sixteen blocks of virtual image 44 and places the resulting blocks into display memory 36. From display memory 36, virtual image 44 can be processed, displayed, or just stored. Significantly, image processor 14 need not devote processing resources and time to decompressing the entire full image, but only the MCUs relating to blocks within virtual image 44, since edge tables or DC value arrays are available in the invention.

During initialization, decoder 24 operates in parallel with edge value calculator 26, although in other embodiments, their operation is serial or totally independent. Edge value calculator 26 scans the blocks in compressed image memory 12, evaluating only the differential values in each block, which being differential, require reference to a reference block. For one standard, the JPEG standard, each block contains a differential value for DC intensity, and the reference block is the block to the left of the block being decoded. For example, to find the absolute DC value for block n+2 (see FIG. 2), a differential value is extracted from block n+2 and the absolute DC value for block n+1 is subtracted from the extracted value. However, since block n+1 is not decompressed (it is not within virtual image 44), only the DC value is extracted from that block by edge value calculator 26. To avoid the delays when panning a virtual image across a full image, left and right edge tables 38,40 are provided.

Figure 4:
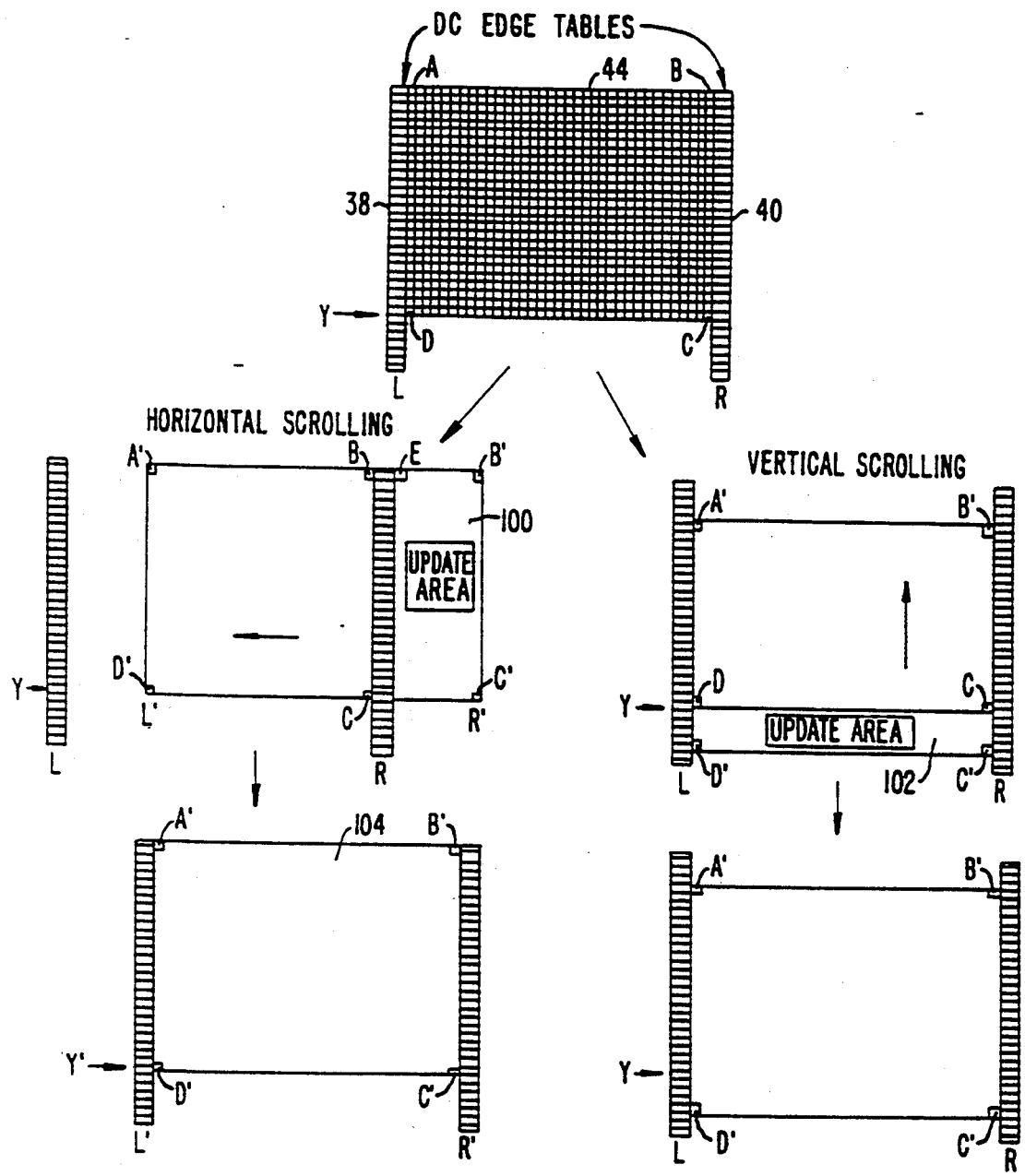
FIG. 4 shows a virtual image and corresponding edge tables and illustrates the use of the edge tables.

FIG. 4 better illustrates the relationship between the edge tables and virtual image 44, which is stored in display memory 36. Virtual image 44 is initially bounded by blocks A, B, C and D. Left edge table 38 contains one entry for each row of full image 42, and the table will often reach beyond the bounds of virtual image 44. The entry for each row contains an absolute DC value for the block in that row and just to the left of the left-most column of blocks in virtual image 44. For example, left edge table entry Y is the DC absolute value for the block in the full image which would be to the left of block D. Similarly, right edge table 40 contains entries for the DC absolute values of blocks in the right-most columns of virtual image 44. Thus tables 38,40 each contain M entries.

When virtual image 44 is scrolled horizontally across full image 42, new blocks in update area 100 are decompressed and moved into display memory 36. To fully decompress a block the DC differential values for each block to the left of the blocks being decoded must be summed, unless the edge tables are used. Instead, with the right edge table, only one sum or subtraction is needed. For example, when block E is decompressed the absolute DC value for block E is found from the differential DC value in block E and the absolute DC value for block B, which is stored in the right edge table. As each new column is introduced into the virtual image, the edge tables are updated with the absolute DC values for the new columns. For example, the entry which held the absolute DC value for block B would hold the absolute DC value for block E after scrolling left one column. In other compression schemes, a top and a bottom edge table might be used, where differential values reference blocks above and below a block being decoded. The resulting virtual image 104 and resulting edge tables L' and R' are shown.

Two edge tables are not strictly necessary, but for larger virtual images less computation is required during scrolling when two tables are used. If, for example, right edge table 40 is not present, the absolute DC value for block E could be determined from the left edge table, summing the differential DC values for each block in the top row of virtual image 44. Even with one edge table, the number of sums required is reduced by the number of blocks between the edge of the virtual image having the edge table and the edge of the full image. Since edge value calculator 26 determines the absolute DC values for blocks including those in virtual image 44, these values can be provided to decoder 24 which uses the values to decode blocks.

When a virtual image is scrolled, scroller 30 uses the DC values in the edge tables to provide offsets for blocks being scrolled into the virtual image. For example, if the virtual image were panned such that the left edge of the virtual image moved from the 205th column of the full image to the 204th column, blocks in the 204th column which are within the new virtual image would need to be decoded and placed into display memory 36. Instead of performing 203 subtractions to find the absolute DC value of a block in the 204th column, the absolute DC values for each block in the 204th column can be read from the appropriate entry of the left edge table. The left edge table is then updated to hold the absolute DC values of the 203rd column, which are calculated from the absolute DC values of the 204th column and the DC differential values of the 204th column.

Similarly, if the right edge of the virtual image is the 204th column, right edge table 40 contains the absolute DC values for the 205th column. When scrolling right one column, scroller 30 directs decoder 24 to decode the MCUs corresponding to the blocks of the new virtual image. The new blocks are in the 205th column, so the absolute DC values for those blocks are readily available in right edge table 40. The right edge table is then updated, changing each entry therein by the differential DC value of the blocks in the 205th column, resulting in the DC values for blocks in the 206th column.

When the virtual image is scrolled up, the edge tables do not change, but different entries are used. Since the edge tables extend the length of the full image 42, the virtual image can be scrolled from the top to the bottom of the full image without needing to change any entries in the edge tables.

Image editor 28 can be an interactive device where a person edits the image while viewing the contents of display memory 36, or image editor 28 can be an automated process. One application is the modification of an image within a copier in response to commands input by a user with or without the user viewing the contents of display memory 36. When an edit is saved, image updater 32 recompresses the edited MCU, stores the edited MCU at an available location in the edited image data region 20, and updates the pointer in pointer array 34 associated with that MCU to point to the newly saved, edited MCU. Image updater 32 also saves a reference field with the edited MCU indicating which MCU the edited MCU replaces. This way, if image editor 28 initiates an "undo" operation, image updater 32 can simply change the pointer to point to the MCU referenced by the newly saved MCU, effectively cancelling the previous edit. Image updater 32 and image editor 28 are also capable of operating on more than one MCU simultaneously. Since image updater 32 updates pointer array 34 for each edited MCU, pointer array 34 is up to date, and compressed image memory 12 need not be scanned by pointer generator 22, until a new compressed image is loaded into compressed image memory 12.

Figure 5:
FIG. 5 shows a pointer from a pointer array.

FIG. 5 shows a pointer 35 from pointer array 34. In the described embodiment, the pointer is 32 bits, the most significant bit for holding an edit flag 50, and the remaining 31 bits forming an MCU address 52. "Virtual editing" is accomplished by using tools to alter the image data in display memory 36. When pixels within a block are edited, the edit flag in the pointer for that block's MCU is set. Because editing could affect the absolute DC value for the edited block, the edit flag in the pointer for the block to the right of the edited block is also set, because the differential DC value for the block on the right changes with the absolute DC value for the block on the left. Once an editing session is complete, pointer array 34 is scanned for edit flags which are set. For each flagged area, blocks are decoded from compressed image 12, starting from the left visible block for each row of blocks of the flagged area, to determine the DC values for the blocks to the left of each edited block. If an edited block falls on the left-most or right-most edge, the DC edge table is updated with the new value.

Figure 6:
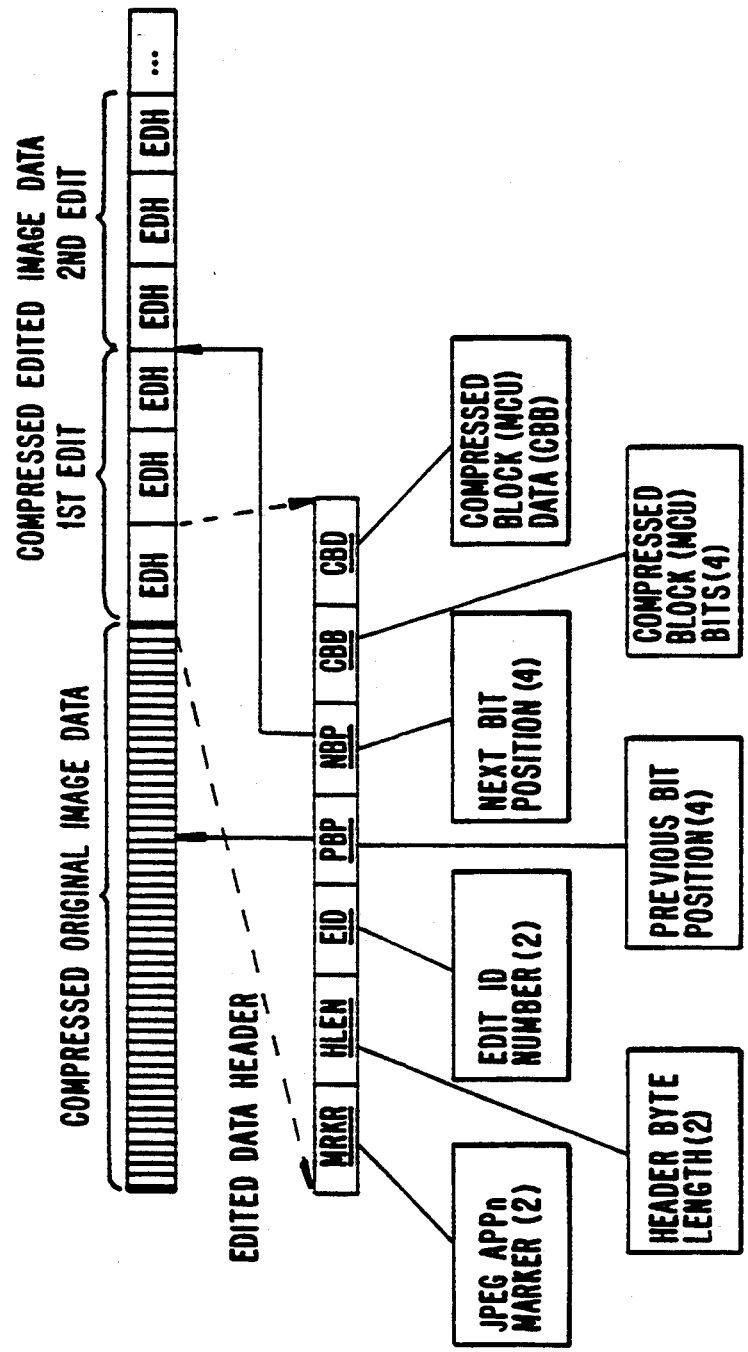
FIG. 6 shows the fields of an edit header for an edited MCU.

As shown in FIG. 6, the new edit data is appended to the original image data region 18 in edited image data region 20. Thus, pointer array 34 can address compressed image memory 12 as a single linear memory. Once the edited MCU is created, the edit header fields shown in FIG. 6 are initialized, the edited MCU is stored in region 20, and the pointer in the pointer array is initialized to point to the start of the edit header in the newly stored edited MCU.

The MRKR and HLEN fields are provided so that the edited MCUs conform to the JPEG standard. The PBP field points to the previous version of the MCU. The previous version is in region 18 for the first edited MCU, but if an edited MCU is edited again, the PBP field of the second edited MCU will point to the first edited MCU. The NBP field in the first edited MCU is then set to point forward to the second edited MCU, thus forming a linked list. The CBB field indicates the number of image data bits to follow, thus allowing the image file to be scanned by skipping from one header to another until the desired header is found. The CBD field contains the image data itself. Again, since the data in the CBD field is entropy encoded, the number of bits varies from MCU to MCU. These fields allow an edited image file to be read sequentially into a new image file, reordering the MCUs in the edited region into an image file where the edited MCUs are incorporated into the original data region of the new image file, and the edited region of the new image file is empty.

FIGS. 7–11 illustrate an alternate embodiment of an editing system. In this editing system 100 (see especially FIG. 10), the input blocks are processed according to an editing function, and editing system 100 uses either a DC value array or a DC constant offset to avoid the need for edge tables. Editing system 100 is fully capable of supporting the interactive editing and undo features of editing system 10 shown in FIG. 1. That system, editing system 10, is also adaptable for using a DC value array or a constant offset shown in FIGS. 7–8 in place of edge tables.

Figure 7:
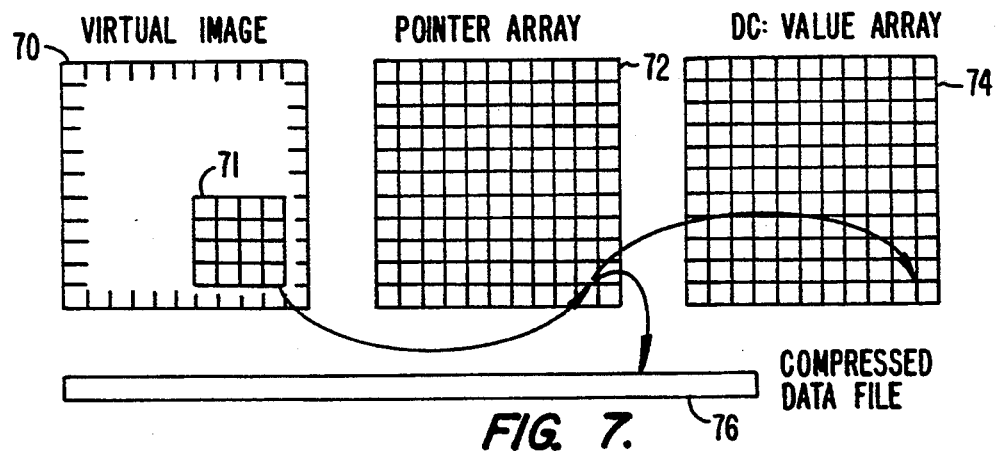
FIG. 7 is an illustration of how a DC value array and a pointer array are used to extract a portion of a virtual image from a compressed image data file, with arrows showing related entries of each.

FIG. 7 illustrates the use of a pointer array table 72 and a DC value array table 74 to extract a portion 71 of a virtual image 70 from a compressed data file 76 containing the image represented by virtual image 70. When a block, such as the lower right block of portion 71, is to be extracted from compressed data file 76, the block's location in virtual image 70 is used to index into pointer array table 72 to return a pointer to the MCU containing that block, and to index into DC value array 74 to return a DC value for the block. The returned pointer is used to locate the compressed MCU for the block in data file 76, and the returned DC value is used as the DC offset of the block to its right, as per the JPEG standard. Thus, when the retrieved block is decompressed, the DC value in the inverse cosine transform is found by adding the returned DC value and the differential DC value stored with the compressed MCU. Alternately, to save one step, the DC value array could contain the absolute DC values for each block, so that the DC value for the inverse cosine transform could be read directly from DC value array 74, rather than having to combine a value from the array with a value from the block.

Figure 8:
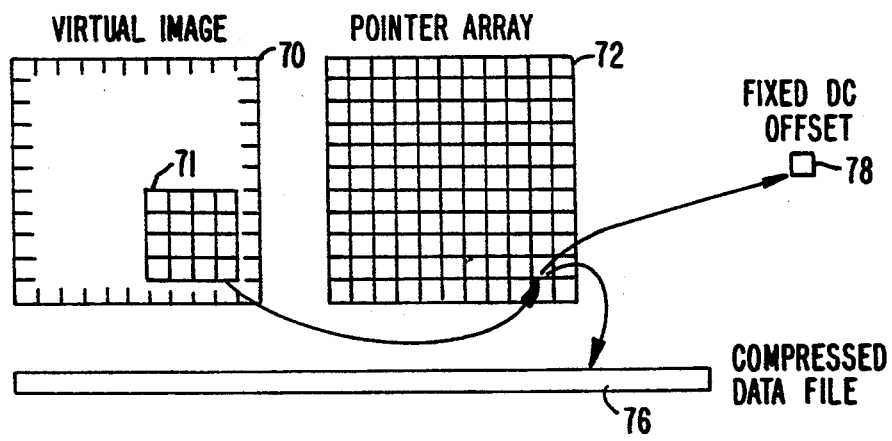
FIG. 8 is an illustration similar to FIG. 7, with the DC value array replaced by a single fixed DC offset value.

FIG. 8 illustrates the use of a fixed DC offset 78 in place of the DC value array 74. Offset 78 provides a single value which is added to all differential DC values read from blocks in a compressed image, whereas DC value array 74 provides independent values for each block. The advantage to using offset 78 is the reduction of storage required for DC values to a single value. In some cases, an offset value of zero is suitable, in which case offset 78 and the step of adding it can be eliminated altogether.

Even counting the additional space for a full DC value array, a compressed image takes up less space than the entire image would. Continuing a previous example of an 8.5"×11" image with a 400 pixels/inch resolution, 2:1:1 subsampling, and 1 byte/component, the uncompressed image would occupy 93.5 inch$^2$*160,000 pixels/inch$^2$*3 components/pixel, 1 byte/component, or 44.88 Mb. With 64 pixels/block, the image would require 467,500 blocks. If each MCU is two blocks and requires one 4-byte pointer and two 2-byte DC values (one for each block of the MCU), pointer array 72 would have 233,750 entries of 4 bytes each, requiring 935,000 bytes, and DC value array 74 would have 467,500 entries of 2 bytes each, requiring 935,000 bytes. With a 10:1 overall compression ratio, the compressed image stored in file 76 (4.488 Mb), pointer array 72, and DC value array 74, only occupy 6.358 Mb, which is still a compression ratio of 44.88:6.358, or about 7:1.

Figure 9:
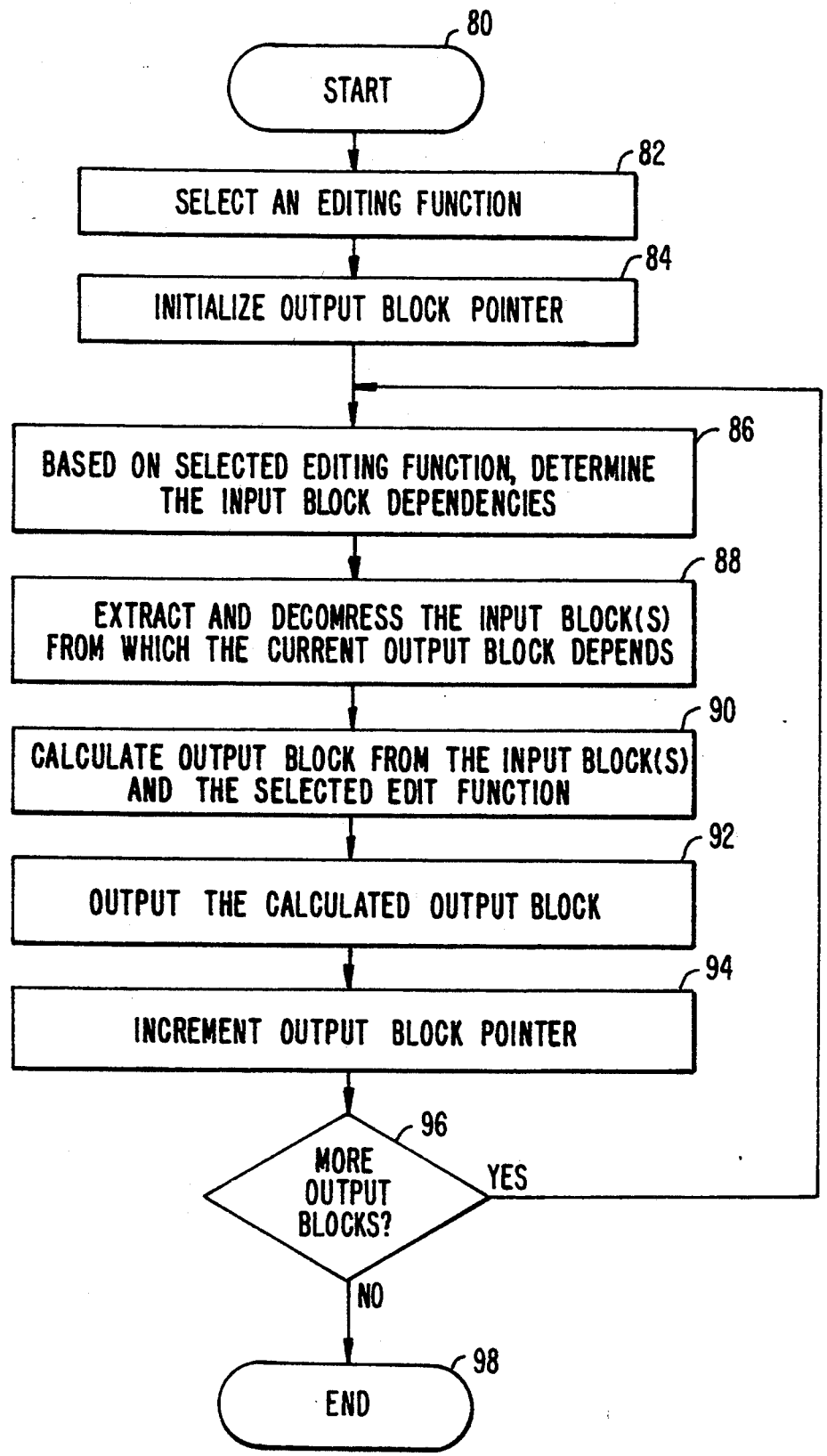
FIG. 9 is a flowchart of an editing process according to the present invention.
Figure 10:
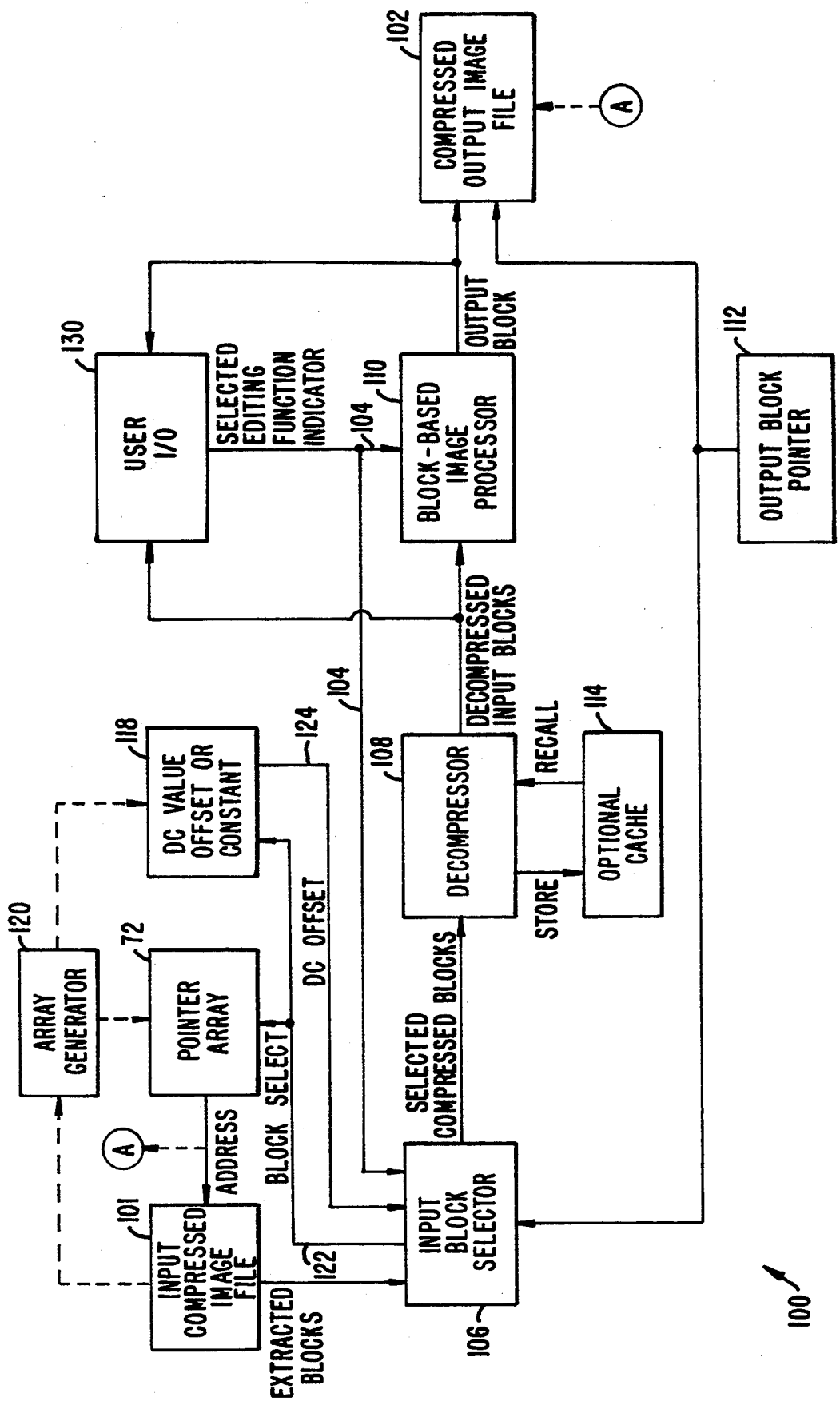
FIG. 10 is a block diagram of an image editing apparatus according to the present invention which, in one embodiment, operates according to the flow described in FIG. 9.

FIG. 9 is a flowchart of an editing process as might be performed by editing system 100 shown in FIG. 10. The process is shown starting at a step 80 and proceeding through to a step 98. From step 80, editing system 100 proceeds to step 82.

In step 82, editing system 100 selects an editing function, and proceeds to step 84. Typical editing functions include panning, scaling, rotating and masking. In some embodiments, this editing function is predetermined, while in other embodiments, a user selects an editing function, usually after viewing either a portion of the input image or the output image.

In step 84, editing system 100 initializes an output block pointer to point to the first output block to be processed, and then proceeds to block 86.

In step 86, editing system 100 determines which input blocks are to be processed to generate the current output block, and proceeds to step 88. The input blocks are determined based on the current output block pointer and the particular editing function. For example, if the editing function was a color change only, then the output block is a function of the editing function and a single input block, whereas if the editing function is a translation, the output block might be a function of up to four input blocks.

In step 88, editing system 100 extracts and decompresses the input blocks needed to generate the output block, and proceeds to step 90. The input blocks to be extracted can be found by locating the pointers for the MCUs containing the blocks in a pointer array and using the pointers to address the MCUs in a compressed image. In the process of decompressing the input blocks, the DC values (either the absolute values, or a relative offset) for the input blocks are read from a DC value array. In this step, a cache might be provided to editing system 100 to store decompressed input blocks to be used with other output blocks which might depend from the same input block.

In step 90, editing program 100 calculates the pixel values for the output block based on the input blocks and the editing function, and proceeds to step 92, where the output block is output to form an output image file.

Next, in step 94, the output block pointer is incremented to point to the next output block, and then at step 96, depending on whether more output blocks remain to be calculated or not, flow passes back to block 86 for the next output block, or processing ends at step 98.

FIG. 10 illustrates an editing system 100 according to the present invention, which edits a compressed input image 101 into a compressed output image 102. The input and the output images, in some embodiments, are stored together as a collection of input MCUs with output MCUs either replacing input MCUs or being appended to the input MCUs, as shown by image 12 in FIG. 1.

Referring again to FIG. 10, editing system 100 comprises an input block selector 106, a block decompressor 108, a block-based image processor 110, a register 112, an optional cache 114, and a memory 118. An array generator 120 is provided to populate pointer array 72 with pointers to input blocks and memory 118 with either a DC value array or a fixed DC offset value. User I/O 130 is also provided to allow a user of editing system 100 to select editing functions and view input and/or output image blocks.

Input block selector 106 receives an input from a line 104 on which an indication of an editing function is provided by user I/O 130 or another source, and an input from register 112 which provides an indication of the current output block being processed. Input block selector 106 has an output for indicating which input blocks are selected over block select line 122. Block select line 122 is used to address pointer array 72 and, if a DC value array is used, to address memory 118. Input block selector 106 also has an input for receiving the selected blocks/MCUs from input image 101, an input for receiving a DC offset from memory 118 over line 124, and an output coupled to decompressor 108 for providing the selected blocks/MCUs to decompressor 108. In an alternative embodiment, line 124 couples directly to decompressor 108 and input block selector 106 does not calculate DC values.

Decompressor 108 has an output to output decompressed blocks to image processor 110, and in some embodiments, includes an output to a cache 114 for outputting decompressed blocks and an input for recalling decompressed blocks from cache 114. A cache is used where speed is more important than circuit size, and where the editing functions are known to use input blocks repeatedly.

Image processor 110 includes an input for receiving the indication of the selected editing function from line 104, and an output for outputting an output block. The content of register 112 is provided to output image file 102, so that the block output by image processor 110 is stored in the proper location, however in some embodiments, the content is provided to image processor 110, which then attaches an indication of the address to the block being output to image file 102. In yet other embodiments, the address of the output block is implied by the order in which the block is output.

Array generator 120 has an input for receiving information from input image file 101 and two outputs, one for outputting pointer values to pointer array 72 and one for outputting DC values to memory 118. The lines connecting array generator 120 to other components are dashed to indicate that these lines are only used during an initialization of pointer array 72 and memory 118, and are not needed after the initialization. This is not to say that pointer array 72 and memory 118 are not updated. If implemented as part of an editing system where the output image and the input image are combined, a mechanism (not shown in FIG. 10) is provided to update pointer array and memory 118 as blocks are edited and moved in the input image file.

In operation, register 112 is initialized with a pointer to the first output block of interest, and is programmed to scan through pointers to all the other blocks of interest. For example, if the portion 71 of image 70 (see FIGS. 7-8) is to be operated upon by an editing function, then register 112 will point to each of the 16 blocks in portion 71 sequentially. From the particular editing function indicated on line 104 and the output block indicated by register 112, input block selector 106 can determine which blocks to input. For example, if the selected editing function was a reflection through a pixel in the center of image 70 and the current output block was the lower left corner pixel, then the input block to be selected would be the upper right corner pixel. With other editing functions, such as rotates, scales, and fractional block translations, more than one input block might be selected for the current output block.

Once the input blocks are selected, they are extracted from input image file 101 (unless input block selector is also tied to cache 114 and the selected blocks are already stored there). To find a block, input block selector 106 outputs an MCU address for the MCU containing the block onto block select line 122 and pointer array 72 provides a pointer to the selected MCU. The selected MCU, together with the DC value offset for the selected block, is provided to decompressor 108. In some embodiments, the DC value is combined with the DC differential value stored with the block in input image file 101 before the block is sent to the decompressor.

Once the selected blocks are decompressed by decompressor 108, the decompressed blocks are provided to image processor 110. But one improvement provided by editing system 100 over the prior art is that even when the entire image is to be processed, the entire input image file need not be decompressed all at once since only a small subset of the image is usually needed for any given operation of image processor 110. Image processor 110 outputs the output block, which according to the operation of editing system 100 is a function only of the selected input blocks and the selected editing function. Yet another improvement provided by editing system 100 is that, with memory 118 properly initialized, the selected MCUs are extracted from input image file 101 without reference to any MCUs except those selected. Where edge tables or DC value arrays are not used, blocks beyond the selected blocks must often be retrieved to determine the proper DC value offset of the selected blocks.

Figure 11:
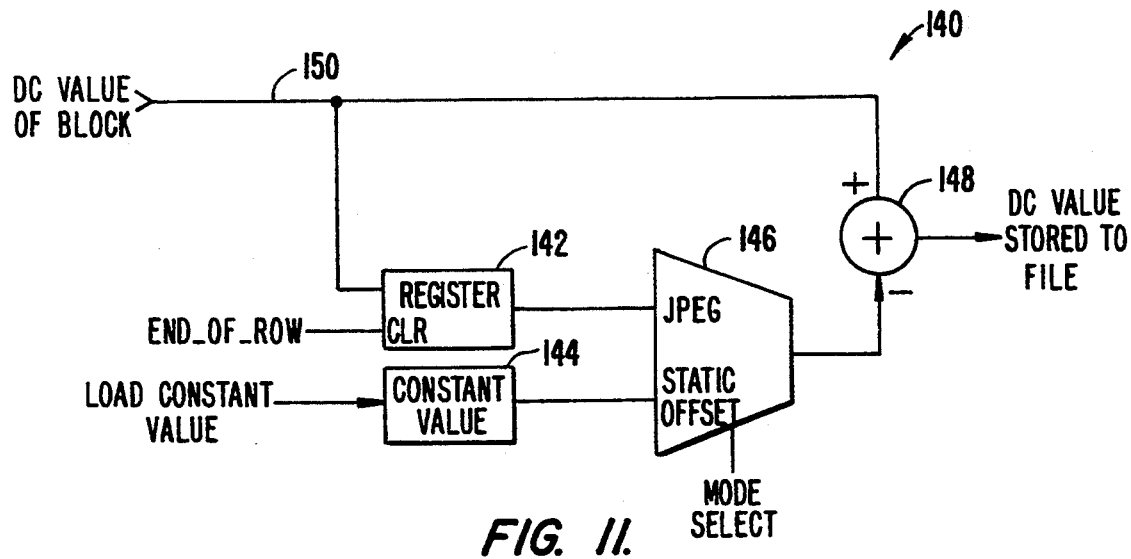
FIG. 11 is a block diagram of an encoding circuit used to encode DC values for blocks being assembled into a compressed image.

FIG. 11 is a block diagram of a DC differential value calculating circuit 140, which comprises a register 142, a register 144, a 2-to-1 multiplexer 146, and a differential adder 148. Register 142 has a delay of one cycle, thus it holds the previously applied DC value, except when an End_Of_Row signal is asserted at a CLR input of register 142, in which case it holds a zero value. An input line 150 is used to provide a DC value of a block to an input of register 142 and to an additive input of adder 148. The outputs of registers 142, 144 are coupled to the respective inputs to multiplexer 146, and the output of multiplexer 146 is provided to a subtractive input of adder 148. Multiplexer 146 includes a mode select input which indicates one of a JPEG-compatible mode and a fixed DC value mode.

Circuit 140 is used to calculate the DC differential value which is stored with a block being compressed. If multiplexer 146 is set in JPEG-compatibility mode, then the value from register 142 is communicated to the subtractive input of adder 148. Thus, a DC differential value output by adder 148 is the DC value of a block less the DC value of the previous block, or zero if the block is the first block in a row. If multiplexer 146 is set in its fixed DC value mode, the value from register 144 is communicated to the subtractive input of adder 148. In that case, the constant value stored in register 144 is subtracted from the DC value of each block before it is output. The constant value can be chosen in several ways, such as being an average of all the absolute DC values of the blocks in an image. If the constant selected is not solely a function of data contained within the compressed image, an additional field can be associated with the image to store the constant for later extraction by array generator 120, which would extract the value into memory 118.

The above description is illustrative and not restrictive. Many variations of the invention will become apparent to those of skill in the art upon review of this disclosure. Merely by way of example, the separately identified units of image processor 14 could be implemented as one or more software programs running on a computer, or the functionality of the units could be combined or further subdivided. The scope of the invention should therefore be determined not with reference to the above description, but instead with reference to the appended claims along with their full scope of equivalents.

What is claimed is:

1. A method for handling a portion of a compressed image for editing, wherein the image is divided into blocks, each block being represented by digital data, and wherein the digital data of at least one block is represented in a minimum coded unit (MCU), a plurality of said MCUs forming a compressed image data file, the method comprising the steps of:

creating a pointer array, wherein each pointer in said pointer array points to an MCU within the compressed image data file, wherein a compressed MCU comprises an MCU header and an MCU body, said MCU header further comprising at least one image block identifier and a length field indicating the number of bits in said MCU, and wherein said MCU body comprises at least one relative value and a plurality of absolute values for qualities of each image block in said MCU body;

selecting blocks from the image to define a virtual image;

creating a reference table, said table comprising at least one value used for converting said relative value of a block into an absolute value for that block;

decompressing a set of MCUs corresponding to said blocks of said virtual image;

editing said virtual image to form at least one edited MCU;

compressing said edited MCU into a compressed edited MCU;

saving said compressed edited MCU in an edited block memory; and modifying a pointer in said pointer array, said pointer corresponding to said compressed edited MCU, said pointer being modified to point to said compressed edited MCU in said edited block memory, whereby said MCUs pointed to by said pointers of said pointer array, as modified in said modifying step, collectively define an edited image.

2. A method for handling a portion of a compressed image for editing, wherein the image is divided into blocks, each block being represented by digital data, and wherein the digital data for at least one block is represented by a minimum coded unit (MCU), a plurality of said MCUs, when compressed, forming a compressed image data file, and wherein a block includes at least one differentially encoded values for a quality of the block, the method comprising the steps of:

creating a pointer array, wherein each pointer in said pointer array points to an MCU within the compressed image data file;

selecting blocks from the image to define a virtual image;

determining an absolute value for the quality which is differentially encoded for each of said blocks selected;

decompressing a set of MCUs corresponding to said selected blocks of said virtual image, using data in said set of MCUs and said absolute value;

editing said virtual image to form at least one edited block;

compressing said edited block into a compressed edited MCU;

saving said compressed edited MCU in an edited block memory; and modifying a pointer in said pointer array, said pointer corresponding to said compressed edited MCU, said pointer being modified to point to said compressed edited MCU in said edited block memory, whereby said MCUs pointed to by said pointers of said pointer array as modified in said modifying step, collectively define an edited image.

3. The method of claim 2, wherein said determining step further comprises the steps of:

referencing a table of offset entries by pointing to an offset entry corresponding to a related block; and adding said pointed to offset entry to a differentially encoded value, resulting in said absolute value for said quality of said related block.

4. The method of claim 2, wherein said determining step further comprises the steps of:

referencing a table of absolute entries by pointing to an absolute entry corresponding to a selected block; and using said pointed to absolute entry as said absolute value for said quality of said selected block.

5. The method of claim 2, wherein said determining step further comprises the step of adding a constant offset to a differentially encoded value to arrive at said absolute value for said quality of said selected block.

6. The method of claim 2, wherein said determining step is performed for all the blocks to be edited before said step of editing and further comprising the step of replacing said differentially encoded values with absolute values before said step of editing.

7. The method of claim 6, further comprising the step of replacing said absolute values with differential values after editing to resulting a JPEG compatible image file.

8. The method of claim 2, wherein said differential encoded quality of a block is a DC value resulting from a cosine transform of pixel color values for a color component of pixels covered by the block.

9. A method for handling a portion of a compressed image for editing, wherein the image is divided into blocks, each block being represented by digital data, including at least one relative value, wherein an absolute value is determined for a block by reference to relative values for other blocks, the method comprising the steps of:

selecting blocks from the image to define a virtual image corresponding to the portion of the compressed image;

determining an absolute value for each and every block of a plurality of blocks which are selectable without regard to whether or not they have been selected;

creating an offset table for holding said absolute values; and using said offset table to determine absolute values for blocks decompressed and added to said virtual image.

10. An image editor, comprising:

an input memory, for storing a compressed image data file comprising a plurality of minimum coded units (MCUs), wherein each MCU of said compressed image data file is addressable and separately decompressabler an MCU encoding pixel color values for at least one block of at least one color component of a set of pixels covered by blocks in said MCU, and wherein a block, when compressed, includes at least one relative value for a quality of at least one pixel covered by said block;

an output memory, for storing a compressed output data file;

a pointer array containing a plurality of pointers which, when initialized, each said pointer references an MCU in either said input-memory or said output memory;

a reference table containing at least one value used in a conversion of said at least one relative value to an absolute value for said quality of a block;

selecting means, coupled to said pointer array and said input memory, for reading compressed MCUs from said input memory at locations indicated by pointers in said pointer array;

decompressing means, coupled to said selecting means and to said reference table, for decompressing at least one MCU into at least one block of pixel color values based on contents of a compressed MCU and at least one value read from said reference table; and image editing means coupled to said decompressing means, for editing pixels of an MCU provided by said decompressor, said image editing means also including a means for outputting an edited MCU.

11. The image editor of claim 10, wherein said reference table contains a single entry, and said entry holds a constant value which said decompressor adds to a relative value of a block to find an absolute value for the quality of said block.

12. The image editor of claim 10, wherein said reference table contains one entry per block in said image data file and said decompressor adds a value stored in said entry to a relative value of a block to find an absolute value for the quality of said block.

13. The image editor of claim 10, wherein said reference table contains one entry per block in said image data file and said decompressor uses a value stored in said entry as an absolute value for the quality of said block.

14. The image editor of claim 10, wherein said reference table, once generated, is stored in said input memory, with each entry of said reference table associated with a block in an MCU in said input memory.

15. The image editor of claim 14, wherein the entries of said reference table replace said relative values of each block in said input memory.

16. In an image editing system, wherein a full image is divided into M rows and N columns of blocks and the image within each block is represented as a set of digital values including a DC offset value, the DC offset value indicating a difference between a DC value for the block and a DC value for a block to the left of the block, and wherein a virtual image comprising Y rows and X columns of blocks are displayed on a display, the virtual image on the display defined by a top row of blocks, a bottom row of blocks, a left column of blocks, and a right column of blocks, where Y is less than M, X is less than N, the Y rows are chosen from the M rows and the X columns are chosen from the N columns, an improved method of panning the virtual image over the full image comprising:

creating a left edge table containing M entries, each entry corresponding to a DC value of a block in a column adjacent on the left to the left column of the virtual image;

creating a right edge table containing M entries, each entry corresponding to a DC value of a block in a column adjacent on the right to the right column of the virtual image;

using said left edge table to calculate DC values for blocks added to the virtual image when the virtual image is panned left with respect to the full image; and using said right edge table to calculate DC values for blocks added to the virtual image when the virtual image is panned right with respect to the full image.

17. In an image editing system, wherein a full image is divided into M rows of blocks and the portion of the image lying within each block is represented as a set of digital values including a DC offset value, the DC offset value indicating a difference between a DC value for the block and a DC value for a block to the left of the block, and wherein a virtual image comprising Y rows of the blocks are displayed on a display, the virtual image on the display having a left column of blocks, an improved method of panning the virtual image over the image comprising:

creating a left edge table containing M entries, each entry corresponding to a DC value of a block in a column adjacent on the left to the left column of the virtual image; and using said left edge table to calculate DC values for blocks added to the virtual image when the virtual image is panned left with respect to the full image.

18. An image editor, wherein a full image comprises a pattern of pixels and each pixel is represented by a digital value in an image file, and wherein the image file comprises minimum coded units (MCU), each MCU representing the digital values for each pixel in a group of pixels, comprising:

a compressor for compressing the MCUs of an image file into compressed MCUs;

a decompressor for decompressing said compressed MCUs into decompressed MCUs;

an original block memory for holding MCUs from the image file;

an editor for manipulating data in said decompressed MCUs;

an edited block memory for holding edited MCUs resulting from said compressor recompressing MCUs edited by said editor;

an array of pointers for mapping said MCUs in said original block memory and said recompressed edited MCUs into the image, wherein the editor is provided selected decompressed MCUs as if the entire image file was decompressed.

* * * * *